UNITED STATES PATENT OFFICE.

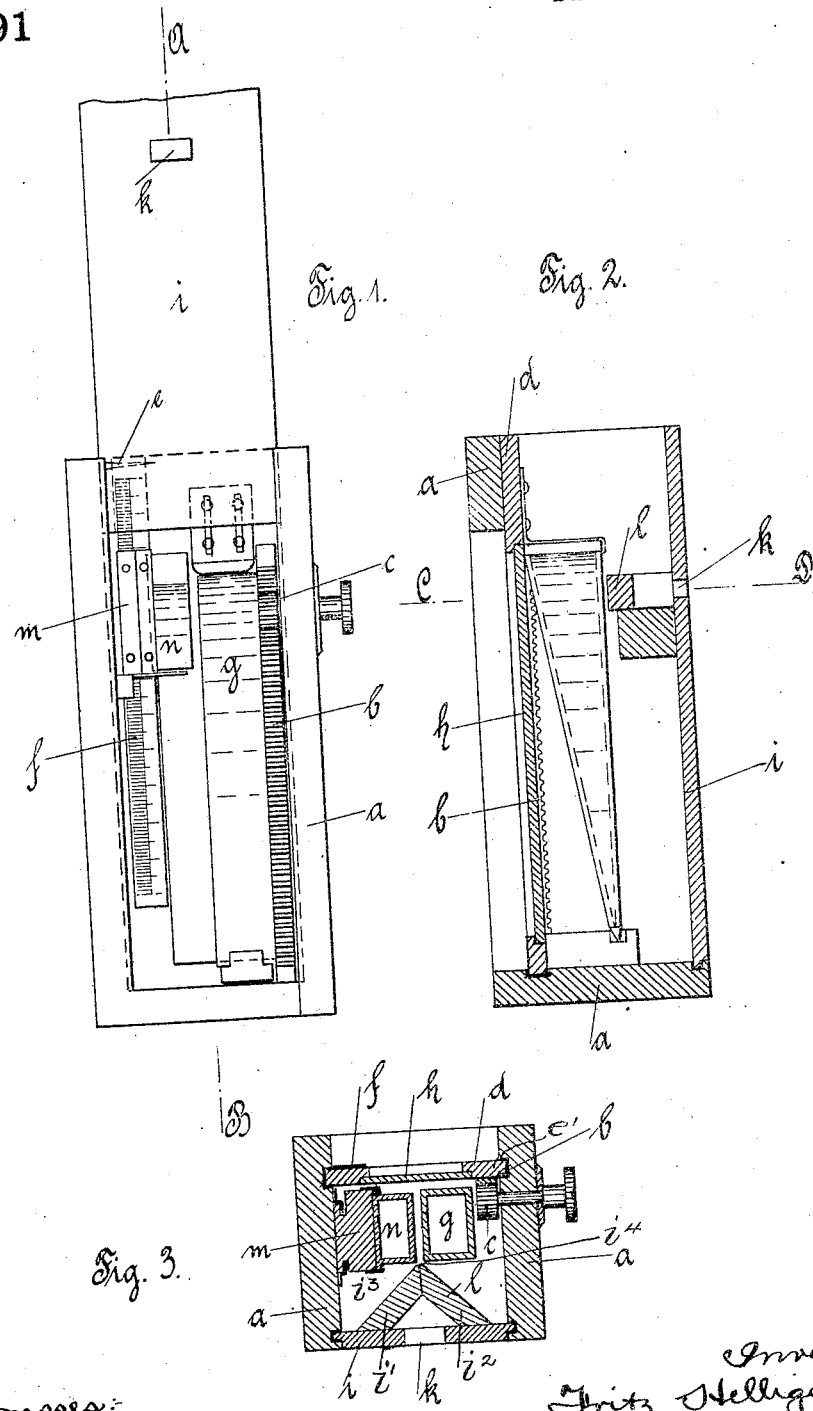

FRITZ HELLIGE, OF FREIBURG, BREISGAU, GERMANY.

COLOR-MEASURING DEVICE.

998,091.

Specification of Letters Patent. Patented July 18, 1911.

Application filed October 8, 1910. Serial No. 586,061.

*To all whom it may concern:*

Be it known that I, FRITZ HELLIGE, a subject of the German Emperor, residing at Freiburg i. Breisgau, in the Grand Duchy of Baden, Germany, have invented certain new and useful Improvements in Color-Measuring Devices, of which the following is a specification.

The present invention relates to a color measuring device, which is applicable for use in medical, chemical and industrial purposes, and is characterized in that the liquid serving for purposes of comparison in the determination of the color is inclosed in a vessel of wedge-shaped cross section, which can be moved in relation to the liquid to be examined, which latter is contained in a suitable receptacle held in a relatively fixed position, and so renders it possible to obtain a view through a fluid layer of variable thickness. By this means gradations of color are established by the sliding movement, by which, on comparison with the color of the liquid to be examined, the percentage contents of the latter in color-substances, can be accurately determined by photometrical methods, and the dividing line between the two halves of the field of vision can be caused to disappear by the use of a Helmholtz double glass plate, this being the critical point in the accuracy of the photometrical determination.

The invention is distinct from the hitherto customary color-measuring devices, which are either very expensive and lack simplicity of construction, or else can only be applied for very limited determinations of blood-colored materials, in that it is always ready for use, can be applied for all purposes in measuring gradations of color, gives a rapid determination with great accuracy, and the various parts forming the construction can be easily replaced.

A constructional form of the invention is shown in the drawing, in which—

Figure 1 is an elevation with the closing lid shown partly removed. Fig. 2 is a longitudinal section on the line A—B of Fig. 1, and Fig. 3 is a cross section on the line C—D of Fig. 2.

The color measuring device consists essentially of a wooden vessel $a$, which may be approximately square in cross-section the rear side of which consists of a sliding element $e'$ operated by means of a rack $b$ fixed to the sliding element and pinion $c$. The said sliding element carries a scale $f$ adapted to be adjusted in relation to a fixed pointer $e$. On the sliding member is provided a vessel $g$ of wedge-shaped cross section adapted to contain the fluid by which the comparison is made, so that the inclosed fluid shows on inspection a variable thickness according to the point at which it is viewed and consequently gradations of color. Behind the wedge-shaped vessel the sliding member is provided with an opening, which is closed by a glass plate, which allows diffused light to enter the vessel. The front side of the wooden vessel is provided with a wooden sliding member $i$, which is provided at a suitable height with an inspection aperture $h$ behind which a Helmholtz double glass plate $l$ is provided. The said Helmholtz double glass plate consists of two plane glass plates $i'$ and $i^2$ each of which is beveled at $i^3$ at an angle of 45°, so that the plates $i'$ and $i^2$ will be arranged at right angles to each other as shown in Fig. 3. The two glass plates are of equal thickness and are cemented together at the edges $i^3$. In the construction illustrated, the Helmholtz double glass plate is so disposed that its edge $i^4$ coincides with the inner edge of the wedge-shaped vessel $g$.

On the broad side of the frame opposite the vessel $g$ there is provided a trough $n$ on a stationary tray $m$. This is the color container for the reception of the liquid to be examined, which should be made so that it will resist acid, transparent glass being suitable for its construction.

When the Helmholtz double glass plate is adjusted in the position shown in Fig. 3, the light passing through the wedge-shaped vessel $g$ and receptacle $n$ and through the said glass plate will produce, on the eye of an observer at opening $k$, a sensation of a continuous color band, that is to say the two fields of vision will register and there will be no dividing line apparent between the two fields of vision through receptacles $g$ and $n$.

In the use of the color-measuring device the sliding member $d$ and the vessel $g$ containing the liquid for comparison, are moved past the trough $n$ containing the liquid to be examined, until both liquids appear in the field of vision as seen through the Helmholtz double glass $l$ to be of the same color and of equal clearness. The measurement indicated by the pointer $e$ can then be read on the scale $f$ and with the help of a suitable table the percentage composition obtained.

The liquid used for comparison in the wedge-shaped vessel $g$ consists, for the color-measurement of blood, titanic acid, and so on, not of these materials themselves but of a mixture of unchangeable color substances which exhibit exactly the same color in the spectroscope as in white light.

I claim:—

1. A color measuring device, consisting of a suitable casing, the front of said casing being provided with a sight opening, a fixed receptacle within said casing adapted to contain a liquid to be examined, a wedge-shaped receptacle adapted to contain a standard solution said wedge-shaped vessel being movable with respect to said first-named receptacle, and two plates of glass disposed at said sight opening in end to end relation to each other, said plates being angularly arranged with respect to each other and each plate being angularly inclined with respect to the front of said casing, one being in the path of rays of light passing through one of said receptacles and through said sight-opening, and the other being in the path of rays passing through the other of said receptacles and through said sight opening, whereby a sensation of a continuous color band will be produced on the eye of the observer.

2. A color measuring device, consisting of a suitable casing, the front of said casing being provided with a sight opening, a fixed receptacle within said casing adapted to contain a liquid to be examined, a wedge-shaped receptacle also within said casing adapted to contain a standard solution said wedge-shaped vessel being movable with respect to said first named receptacle, and two plates of glass disposed at said sight opening, said plates of glass being positioned at substantially 90° to each other and being so disposed that rays of light may pass through one of said receptacles and one of said glass plates and through said sight opening, and additional rays of light may pass through the other of said receptacles and the other of said glass plates and also through said sight opening.

3. A color measuring device, consisting of a suitable casing, the front of said casing being provided with a sight opening, a fixed receptacle within said casing adapted to contain a liquid to be examined, a wedge-shaped receptacle adapted to contain a standard solution said wedge-shaped vessel being movable with respect to said receptacle, and two plates of glass disposed at said sight opening, each of said glass plates being beveled and the two glass plates being cemented together at their beveled edges, the said cemented edges being disposed immediately adjacent the edge of said wedge-shaped vessel which is nearest said fixed receptacle.

4. A color measuring device, consisting of a suitable casing, the rear side of said casing being movable up and down, a scale mounted on said rear side of said casing, a fixed receptacle within said casing adapted to contain a liquid to be examined, a wedge-shaped receptacle carried by the said rear side of the casing and movable therewith adapted to contain a standard solution, said rear side of the casing being provided with means for the admission of light rays and the front of said casing being provided with a sight opening, and two plates of glass disposed at said sight opening, said plates of glass being positioned at substantially 90° to each other and being so disposed that rays of light may pass through one of said receptacles and one of said glass plates and through said sight opening, and additional rays of light may pass through the other of said receptacles and the other of said glass plates and also through said sight opening.

5. A color measuring device, consisting of a suitable casing the rear side of said casing being movable up and down, a scale mounted on said rear side of said casing, a fixed receptacle within said casing adapted to contain a liquid to be examined, a wedge-shaped receptacle carried by the rear side of the said casing and movable therewith adapted to contain a standard solution, said rear side of the casing being provided with means for the admission of light rays and the front of said casing being provided with a sight opening, and two plates of glass disposed at said sight opening, each of said glass plates being beveled at one edge thereof and the two glass plates being cemented together at the said beveled edges, the said cemented edges being disposed immediately adjacent the edge of said wedge-shaped vessel which is nearest said fixed receptacle.

Dated this 23rd day of September 1910.

In testimony whereof I affix my signature in presence of two witnesses.

FRITZ HELLIGE.

Witnesses:
AUGUST OOSTERMAN,
MARIA FLÄTTIG.